(12) United States Patent
Terada et al.

(10) Patent No.: US 12,463,240 B2
(45) Date of Patent: Nov. 4, 2025

(54) LITHIUM SECONDARY BATTERY

(71) Applicant: Panasonic Intellectual Property Management Co., Ltd., Osaka (JP)

(72) Inventors: Shoshi Terada, Osaka Fu (JP); Akira Kano, Osaka Fu (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 734 days.

(21) Appl. No.: 17/638,500

(22) PCT Filed: Jul. 28, 2020

(86) PCT No.: PCT/JP2020/028819
§ 371 (c)(1),
(2) Date: Feb. 25, 2022

(87) PCT Pub. No.: WO2021/039241
PCT Pub. Date: Mar. 4, 2021

(65) Prior Publication Data
US 2022/0359904 A1    Nov. 10, 2022

(30) Foreign Application Priority Data

Aug. 30, 2019  (JP) .................. 2019-159024

(51) Int. Cl.
*H01M 10/0525*   (2010.01)
*H01M 4/02*      (2006.01)
(Continued)

(52) U.S. Cl.
CPC ....... *H01M 10/0525* (2013.01); *H01M 4/134* (2013.01); *H01M 10/0587* (2013.01); *H01M 2004/027* (2013.01)

(58) Field of Classification Search
CPC ............ H01M 10/0525; H01M 4/134; H01M 10/0587; H01M 2004/027;
(Continued)

(56) References Cited

U.S. PATENT DOCUMENTS 8,846,247 B2   9/2014   Shigematsu et al.
9,923,238 B2   3/2018   Sawa et al.
(Continued)

FOREIGN PATENT DOCUMENTS

CN   103762381 A   4/2014
CN   104685696 A   6/2015
(Continued)

OTHER PUBLICATIONS

Extended (Supplementary) European Search Report dated Nov. 28, 2022, issued in counterpart EP application No. 20857673.6. (7 pages).
(Continued)

*Primary Examiner* — Ula C Ruddock
*Assistant Examiner* — Sarika Gupta
(74) *Attorney, Agent, or Firm* — WHDA, LLP

(57) ABSTRACT

A lithium secondary battery including a positive electrode, a negative electrode, a lithium ion conductive nonaqueous electrolyte, and a separator disposed between the positive electrode and the negative electrode; on the negative electrode, a lithium metal deposits at the time of charging, the lithium metal dissolves in the nonaqueous electrolyte at the time of discharging; the nonaqueous electrolyte contains a cation and an anion; the cation includes a lithium ion, and at least one cation X selected from the group consisting of Na, K, Rb, Cs, Fr, Mg, Ca, Sr, Ba, and Al; and the anion includes an oxalate complex anion Y.

7 Claims, 1 Drawing Sheet

(51) Int. Cl.
  *H01M 4/134* (2010.01)
  *H01M 10/0587* (2010.01)

(58) Field of Classification Search
  CPC ..... H01M 10/0567; H01M 2300/0025; H01M 10/0568; H01M 4/131; H01M 10/052; H01M 10/058; H01M 10/4235; Y02E 60/10; Y02P 70/50
  See application file for complete search history.

(56) References Cited

U.S. PATENT DOCUMENTS

| | | | |
|---|---|---|---|
| 10,476,106 | B2 | 11/2019 | Sawa et al. |
| 11,024,881 | B2 | 6/2021 | Kim et al. |
| 11,205,802 | B2 | 12/2021 | Sawa et al. |
| 11,791,499 | B2 | 10/2023 | Sawa et al. |
| 2013/0022880 | A1* | 1/2013 | Tsujioka ................ H01G 11/64 429/345 |
| 2013/0330609 | A1 | 12/2013 | Sawa et al. |
| 2013/0330610 | A1 | 12/2013 | Shigematsu et al. |
| 2015/0221938 | A1 | 8/2015 | Yamamoto et al. |
| 2015/0236379 | A1* | 8/2015 | Wietelmann ........ H01M 10/052 429/188 |
| 2016/0164143 | A1 | 6/2016 | Sawa et al. |
| 2016/0294006 | A1 | 10/2016 | Onizuka et al. |
| 2017/0331143 | A1 | 11/2017 | Morinaka et al. |
| 2018/0261832 | A1 | 9/2018 | Nho et al. |
| 2019/0198924 | A1 | 6/2019 | Kim et al. |
| 2019/0207258 | A1 | 7/2019 | Kim et al. |
| 2020/0036042 | A1 | 1/2020 | Sawa et al. |
| 2021/0111429 | A1 | 4/2021 | Minami et al. |
| 2022/0069351 | A1 | 3/2022 | Sawa et al. |
| 2023/0395857 | A1 | 12/2023 | Sawa et al. |

FOREIGN PATENT DOCUMENTS

| | | |
|---|---|---|
| CN | 107004904 A | 8/2017 |
| CN | 109690864 A | 4/2019 |
| CN | 109937504 A | 6/2019 |
| JP | H09-293508 A | 11/1997 |
| JP | 2008-282617 A | 11/2008 |
| JP | 2008-305574 A | 12/2008 |
| JP | 2014-143061 A | 8/2014 |
| JP | 2018-133146 A | 8/2018 |
| WO | 2015/001871 A1 | 1/2015 |
| WO | 2017/190355 A1 | 11/2017 |

OTHER PUBLICATIONS

Office Action dated Jan. 11, 2024, issued in counterpart CN application No. 202080059949.2, with English translation. (16 pages).
Ding et al., "Dendrite-Free Lithium Deposition via Self-Healing Electrostatic Shield Mechanism", J. Am. Chem. Soc., 2013, vol. 135, pp. 4450-4456, cited in Specification (7 pages).
International Search Report dated Oct. 27, 2020, issued in counterpart International Application No. PCT/JP2020/028819 (2 pages).
Office Action dated Jun. 18, 2024, issued in counterpart CN application No. 202080059949.2, with Partial English translation. (7 pages).

* cited by examiner

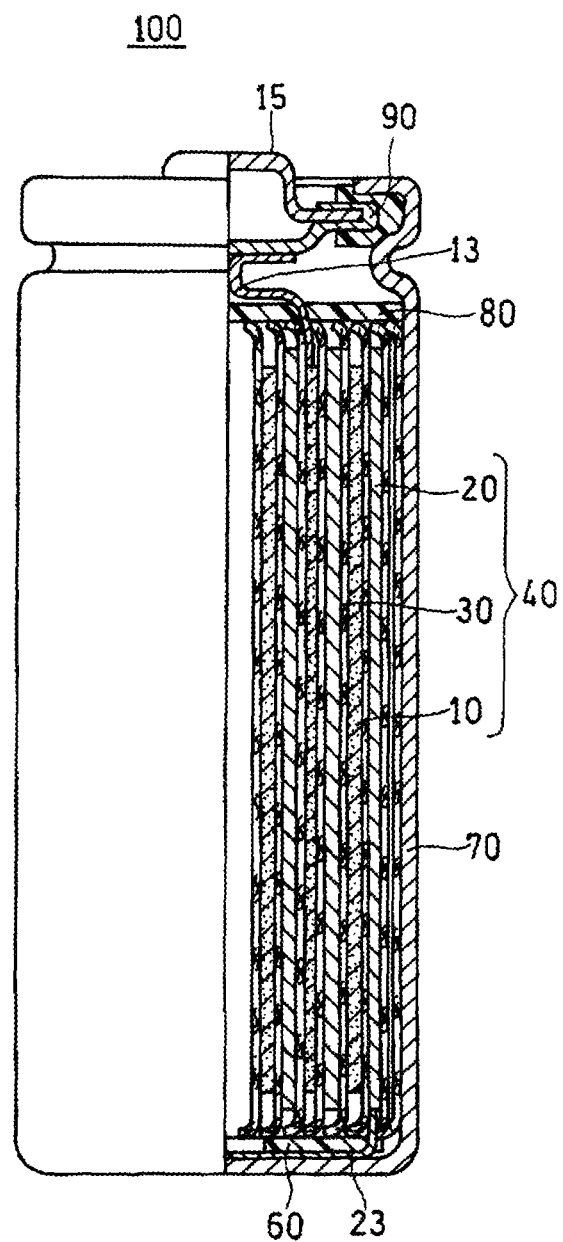

LITHIUM SECONDARY BATTERY

TECHNICAL FIELD

The present disclosure relates to a lithium secondary battery using a lithium metal as a negative electrode active material.

BACKGROUND ART

Nonaqueous electrolyte secondary batteries are used, for example applications for ICT such as personal computers and smart phones, in-vehicle applications, and power storage applications. In such an application, the nonaqueous electrolyte secondary battery is required to have a higher capacity. Lithium ion batteries are known as high-capacity nonaqueous electrolyte secondary batteries. Higher capacity of the lithium ion battery can be achieved by using, for example, graphite and an alloy active material such as a silicon compound in combination as the negative electrode active material. However, the capacity increase of the lithium ion battery is reaching the limit.

A lithium secondary battery is promising as a nonaqueous electrolyte secondary battery having a higher capacity than a lithium ion battery. In the lithium secondary battery, a lithium metal deposits on the negative electrode at the time of charging, and the lithium metal is dissolved in the nonaqueous electrolyte at the time of discharging. The lithium secondary batter is sometimes referred to as a lithium metal secondary battery.

In lithium batteries, a lithium metal deposits on the negative electrode during charging. At this time, the lithium metal may deposit in a dendritic state. However, when dendrite is generated, the specific surface area of the negative electrode increases, and side reactions tend to increase. Therefore, the discharge capacity and cycle characteristics are likely to deteriorate.

In Non-Patent Literature 1, it is described that by adding cesium ions or rubidium ions to an electrolyte, deposition of dendrite is suppressed.

CITATION LIST

Non-Patent Literature

[Non-PTL 1] Fei Ding, et al., "Dendrite-Free Lithium Deposition via Self-Healing Electrostatic Shield Mechanism," J. Am. Chem. Soc., 2013, 135, p. 4450-4456

SUMMARY OF INVENTION

However, even in Non-Patent Literature 1, the effect of suppressing the deposits of dendrite is insufficient, and there is a limit to the improvement of the cycle characteristics of the lithium secondary battery.

One aspect of the present disclosure relates to a lithium secondary battery including: a positive electrode; a negative electrode; a lithium ion conductive nonaqueous electrolyte; and a separator disposed between the positive electrode and the negative electrode, wherein on the negative electrode, a lithium metal deposits at the time of charging and the lithium metal dissolves in the nonaqueous electrolyte at the time of discharging, the nonaqueous electrolyte includes a cation and an anion, the cation includes a lithium ion and at least one cation X selected from the group consisting of Na, K, Rb, Cs, Fr, Mg, Ca, Sr, Ba, and Al, and the anion includes an oxalate complex anion Y.

In the lithium secondary battery, the cycle characteristics are improved.

BRIEF DESCRIPTION OF DRAWING

FIG. 1 is a vertical cross-sectional view schematically showing a lithium secondary battery according to an embodiment of the present disclosure.

DESCRIPTION OF EMBODIMENTS

A lithium secondary battery according to an embodiment of the present disclosure includes a positive electrode, a negative electrode, a lithium ion conductive nonaqueous electrolyte, and a separator disposed between the positive electrode and the negative electrode. On the negative electrode, a lithium metal deposits at the time of charging, and the lithium metal is dissolved in the nonaqueous electrolyte at the time of discharging. The nonaqueous electrolyte includes a cation and an anion. The cation includes lithium ions and includes at least one cation X selected from the group consisting of Na, K, Rb, Cs, Fr, Mg, Ca, Sr, Ba, and Al. The anion includes an oxalate complex anion Y. Cations X are generally represented by $Na^+$, $K^+$, $Rb^+$, $Cs^+$, $Fr^+$, $Mg^{2+}$, $Ca^{2+}$, $Ba^{2+}$, and $Al^{3+}$.

In the lithium secondary battery, deposition and dissolution of the lithium metal are repeated on the negative electrode by charging and discharging. In lithium secondary batteries, lithium metal is almost constantly present in the negative electrode. Therefore, in the lithium secondary battery, the contact opportunities between the lithium metal and the nonaqueous electrolyte increase as compared with the lithium ion battery, and the side reaction between the lithium metal and the nonaqueous electrolyte tends to be conspicuous.

Further, in the lithium secondary battery, as compared with the lithium ion battery, the lithium metal easily deposits in a dendritic state. When the lithium metal is deposited in a dendritic state, the specific surface area of the lithium metal is increased. Thus, side reactions of the lithium metal and the electrolyte are further increased. As a result, the discharge capacity is remarkably lowered, and the cycle characteristics are easily lowered greatly.

In the lithium secondary battery of the present embodiment, during charging, cations X contained in the electrolyte are preferentially co-precipitated together with lithium ions, and an alloy containing lithium and cations X deposits on the negative electrode. Such co-precipitation is considered to proceed more stably than in the case where only lithium ions receive electrons and deposit.

Further, it is considered that the oxalate complex anion Y contained in the electrolyte has an action of stabilizing the lithium ion and the cation X, and plays a role of inhibiting the co-precipitation of the lithium ion and the cation X from proceeding locally. As a result, it is considered that deposition of dendrites is suppressed and the cycle characteristics are remarkably improved. The oxalate complex anion Y tends to coordinate to encapsulate the cation, and this probably affect the stabilization of the cation.

Further, when the oxalate complex anion Y is decomposed on the negative electrode, a stable film is formed on the surface of the negative electrode. It is considered that the oxalate complex anion Y preferentially decomposes over other components contained in the electrolyte to than a uniform and flexible film on the surface of the negative electrode. Further, it is considered that by incorporating the lithium ions and cations X having different ionic radii in such a film, deposition starting points of the lithium metal are produced uniformly, and the co-precipitation of lithium ions and cations X is more likely to proceed further. As a result, deposition of dendrite is further suppressed.

For example, at least one selected from the group consisting of $B(C_2O_4)_2$—, $BF_2(C_2O_4)$—, $P(C_2O_4)_3$—, $PF_2(C_2O_4)_2$—, and $PF_4(C_2O_4)$— may be used for the oxalate complex anion Y. These are considered to have a strong action of stably proceeding the co-precipitation of lithium ions and cations X. Among them, the oxalate complex anion Y containing fluorine is considered to have such an action.

The cation X and the oxalate complex anion Y may be included in the nonaqueous electrolyte as salts thereof, or a salt of the cation X and other anion, and a lithium salt of the oxalate complex anion Y may be included in the nonaqueous electrolyte.

Hereinafter, the configuration of the lithium secondary battery will be described in more detail.

[Negative Electrode]

The negative electrode usually includes a negative electrode current collector. For example, a metal foil can be used as the negative electrode current collector. The negative electrode has a layer containing a lithium metal, i.e., a lithium metal layer or a lithium alloy layer, at least at a charged state. The open circuit potential of the negative electrode at the time of fully charged state is, for example, 0V or more and 70 mV or less with respect to a lithium metal.

"Fully charged" means, when the rated capacity of the battery is regarded as C, a battery is charged until, for example, its state of charge (SOC: State of Charge) is 0.98×C or more. The open circuit potential of the negative electrode at the time of fully charged state may be measured by decomposing the battery in the fully charged state in an argon atmosphere to take out the negative electrode, and assembling a cell using a lithium metal as a counter electrode. The nonaqueous electrolyte of the cell may have the same composition as that of the nonaqueous electrolyte in the disassembled battery, and for example, an electrolyte used in Example 1 described later may be used as a model electrolyte.

As a metal composing the negative electrode current collector, a metal which does not react with lithium metal is preferable, and for example, copper (Cu), nickel (Ni), iron (Fe), and an alloy containing any of these metal elements can be used. For the alloy, for example, a copper alloy and stainless steel (SUS) are preferred. Among them, in terms of excellent conductivity, copper and/or a copper alloy is preferred. The copper content in the negative electrode current collector is preferably 50% by mass or more, and may be 80% by mass or more. The thickness of the negative electrode current collector is not particularly limited, and is, for example, 5 μm to 20 μm.

The negative electrode may include a negative electrode current collector and a plurality of layers stacked on the negative electrode current collector. The plurality of layers may include, for example, a first layer and a second layer. The first layer contains a material capable of storing lithium ions, and the second layer contains lithium metal. In this case, the first layer is disposed closer to the negative electrode current collector than the second layer. The first layer serves to uniformly deposit lithium ions on the negative electrode current collector at the beginning of charging.

As a material capable of storing lithium ions contained in the first layer, for example, a material which can be used as a negative electrode active material of a lithium ion battery can be used. Specifically, a carbon material capable of storing and releasing lithium ions electrochemically, a metal capable of alloying with lithium, and a metal compound can be used. Further, a film of metal capable of alloying with lithium may be formed as the first layer. Specific examples of the metal for forming the metal film include aluminum, zinc, silicon, and tin.

[Positive Electrode]

The positive electrode includes a positive electrode mixture layer containing a positive electrode active material and a positive electrode current collector. The positive electrode mixture layer can be formed by coating a positive electrode slurry in which a positive electrode mixture containing a positive electrode active material, a binder, and a conductive agent is dispersed in a dispersion medium on a surface of a positive electrode current collector and drying the slurry. The dried film may be rolled, if necessary. The positive electrode mixture layer may be formed on one surface of the positive electrode current collector, and may be formed on both surfaces thereof.

When the positive electrode active material contains a composite oxide containing lithium and a transition metal, the molar ratio: $M_{Li}/M_{TM}$ of the total amount of lithium $M_{Li}$ included in the positive electrode and the negative electrode to the amount of the transition metal $M_{TM}$ included in the positive electrode may be 1.1 or less. That is, in a lithium secondary battery (lithium metal secondary battery), most (or all) of lithium involved in charge and discharge is derived from a composite oxide containing lithium and a transition metal, i.e., a positive electrode active material.

Here, the total amount of lithium included in the positive electrode $M_{Li}$ and the negative electrode means a total amount of lithium included in the positive electrode mixture layer per unit area and the negative electrode per unit area (more specifically, the total amount of lithium included in the first layer and the second layer) facing the positive electrode mixture layer. The amount of the transition metal included in the positive electrode $M_{TM}$ refers to the amount of the transition metal included in the positive electrode mixture layer per the above-mentioned unit area.

The molar ratio of lithium to transition metal contained in the composite oxide:lithium/transition metal may be, for example, 0.9 to 1.1.

Examples of the positive electrode active material include a layered rock salt type composite oxide. Specifically, as the positive electrode active material, for example, $Li_aCoO_2$, $Li_aNiO_2$, $Li_aMnO_2$, $Li_aCo_bNi_{1-b}O_2$, $Li_aCo_bM_{1-b}O_c$ (M is at least one selected from the group consisting of Na, Mg, Sc, Y, Mn, Fe, Ni, Cu, Zn, Al, Cr, Pb, Sb, and B), $Li_aNi_bM_{1-b}O_c$ (M is at least one selected from the group consisting of Na, Mg, Sc, Y, Mn, Fe, Co, Cu, Zn, Al, Cr, Pb, Sb, and B), and $LiMPO_4$ (M is at least one selected from the group consisting of Na, Mg, Sc, Y, Mn, Fe, Co, Ni, Cu, Zn, Al, Cr, Pb, Sb, and B) can be used. Equations $0<a\leq1.1$, $0\leq b\leq0.9$, and $2\leq c\leq2.3$ are satisfied. Note that the value "a" indicating the molar ratio of lithium is increased or decreased by charging and discharging.

Among them, a composite oxide of a layered rock salt type containing a nickel element is preferable. Such a composite oxide is represented by $Li_aNi_xM_{1-x}O_2$ (M is at least one selected from the group consisting of Mn, Co and Al, and satisfies $0<a\leq1.1$ and $0.3\leq x\leq1$). In view of increasing the capacity, it is preferable that $0.85\leq x\leq1$ is satisfied. Further, in view of stabilization of the crystal structure, lithium-nickel-cobalt-aluminum composite oxide (NCA): $Li_aNi_xCo_yAl_zO_2$ ($0<a\leq1.1$, $0.85\leq x<1$, $0<y<0.15$, $0<z\leq0.1$, x+y+z=1) containing Co and Al as M is more preferable.

Specific examples of NCAs include $LiNi_{0.8}Co_{0.15}Al_{0.05}O_2$, $LiNi_{0.8}Co_{0.18}Al_{0.02}O_2$, and $LiNi_{0.9}Co_{0.05}Al_{0.05}O_2$.

As the binding agent, resin materials can be used, including, for example, fluorine resins, such as PTFE, PVdF; polyolefin resins, such as polyethylene and polypropylene; polyamide resins, such as aramid resin; polyimide resins, such as polyimide and polyamideimide; acrylic resins, such as polyacrylic acid, methyl polyacrylate, and ethylene-acrylic acid copolymers; vinyl resins, such as PAN and polyvinyl acetate; polyvinylpyrrolidone; polyethersulfone; and rubbery materials, such as styrene-butadiene copolymer rubber (SBR). These may be used singly or in combination of two or more.

Examples of the conductive agent include: graphite, such as natural graphite and artificial graphite; carbon blacks, such as acetylene black; conductive fibers, such as carbon fibers and metal fibers; fluorinated carbon; powders of metal such as aluminum; conductive whiskers, such as zinc oxide and potassium titanate; conductive metal oxides, such as titanium oxide; and organic conductive materials, such as phenylene derivatives. These may be used singly or in combination of two or more.

The shape and thickness of the positive electrode current collector can be selected based on the shapes and ranges of the negative electrode current collector. As the material of the positive electrode current collector, for example, stainless steel, aluminum (Al), and aluminum alloy, titanium can be used.

[Nonaqueous Electrolyte]

The nonaqueous electrolyte has lithium ion conductivity and contains a cation and an anion. However, the cation contains a lithium ion and a cation X, and the anion contains an oxalate complex anion Y.

The nonaqueous electrolyte may be a liquid electrolyte containing a solvent (that is, in a liquid state), or may be in a gel state or a solid state. The gel-like nonaqueous electrolyte includes a liquid nonaqueous electrolyte and a matrix polymer. As the matrix polymer, for example, a polymer material which absorbs the nonaqueous solvent and forms gel is used. Examples of such a polymer material include fluororesin, acrylic resin, and/or polyether resin.

Hereinafter, the electrolyte will be described in more detail exemplarily.

The electrolyte may be prepared, for example, by dissolving a lithium salt and an oxalate complex salt in a solvent. A kind of the lithium salt may be used, or two or more kinds thereof may be used in combination. Also, a kind of the oxalate complex salt may be used, and two or more kinds thereof may be used in combination. At this time, a part of the lithium salt may be an oxalate complex salt, and at least a part of the oxalate complex salt may be a salt of the cation X.

As the lithium salt, for example, a lithium salt of a chlorine-containing acid (for example, $LiClO_4$, $LiAlCl_4$, and $LiB_{10}Cl_{10}$), a lithium salt of a fluorine-containing acid (for example, $LiPF_6$, $LiPF_2O_2$, $LiBF_4$, $LiSbF_6$, $LiAsF_6$, $LiCF_3SO_3$, and $LiCF_3CO_2$), and a lithium halide (LiCl, LiBr, LiI or the like) can be used.

As the lithium salt, a lithium salt of a fluorine containing acid imide may be used. Such a salt includes fluorine containing imide anion. Examples of the fluorine containing imide anion include bis(fluorosulfonyl) imide anion ($N(SO_2F)_2{-}$) (also referred to as FSI), bis(trifluoromethylsulfonyl) imide anion ($N(SO_2CF_3)_2{-}$) (also referred to as TFSI), and bis(perfluoroethylsulfonyl) imide anion ($N(SO_2C_2F_5)_2{-}$).

As the solvent, for example, cyclic carbonic acid ester, chain carbonic acid ester, cyclic carboxylic acid ester, and chain carboxylic acid ester are used. Examples of the cyclic carbonic acid ester include propylene carbonate (PC), ethylene carbonate (EC), vinylene carbonate (VC), fluoroethylene carbonate (FEC), and vinyl ethylene carbonate (VEC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). Examples of the chain carboxylic acid ester include methyl acetate, ethyl acetate, propyl acetate, methyl propionate (MP), and ethyl propionate (EP). A kind of solvents may be used singly, or two or more kinds thereof may be used in combination.

Examples of the solvent include cyclic ethers, chain ethers, nitriles such as acetonitrile, and amides such as dimethylformamide.

Examples of the cyclic ether include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane 1,3,5-trioxane, furan, 2-methylfuran, 1,8-cineole, and crown ethers.

Examples of the chain ether include 1,2-dimethoxyethane, dimethyl ether, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The contents of the lithium salt, the cation X, and the oxalate complex anion Y in the electrolyte can be measured, for example, by using NMR, and ion chromatography.

The concentration of lithium ions in the electrolyte may be, for example, 0.5 mol/liter or more and 3.5 mol/liter or less, 1 mol/liter or more and 2 mol/liter or less, and 1 mol/liter or more and 1.5 mol/liter or less. By setting the lithium ion concentration within the above range, au electrolyte having excellent ionic conductivity and suitable viscosity can be obtained. The oxalate complex anion Y may also be added to the electrolyte in the form of a lithium salt.

The concentration of the cation X in the electrolyte may be, for example, 0.01 mol/liter or more, 0.5 mol/liter or less, or 0.05 mol/liter or more or 0.1 mol/liter or more. In this case, a sufficient effect of improving the capacity retention rate can be obtained. In addition, sufficient lithium ion conductivity can be obtained.

The concentration of the oxalate complex anion Y in the electrolyte may be for example, 0.5 mol/liter or less. In this case, gas generation due to decomposition of the oxalate complex anion Y is remarkably suppressed, and also, an electrolyte having excellent ionic conductivity and a suitable viscosity is easily obtained. In view of making improvement in cycle characteristics more remarkable, the concentration of the oxalate complex anion Y in the electrolyte may be, for example, 0.01 mol/liter or more.

In view of obtaining an electrolyte having even better lithium ion conductivity, for example, when the electrolyte contains $LiPF_6$ as a lithium salt, a molar basis ratio of the oxalate complex anion Y content to the $PF_6$-ions content in the electrolyte may be set to 0.1 or more and 0.5 or less.

[Separator]

A separator is interposed between the positive electrode and the negative electrode. The separator is excellent in ion permeability and has suitable mechanical strength and electrically insulating properties. The separator may be, for example, a microporous thin film, a woven fabric, or a nonwoven fabric. The separator is preferably made of, for example, polyolefin, such as polypropylene and polyethylene.

[Lithium Secondary Battery]

FIG. 3 is a longitudinal sectional view of an example of a cylindrical lithium secondary battery according to an embodiment of the present invention.

A lithium secondary battery 100 is a wound-type battery including a wound-type electrode group 40 and a nonaqueous electrolyte (not shown). The wound electrode group 40 includes a strip-shaped positive electrode 10, a strip-shaped negative electrode 20, and a separator 30. A positive electrode lead 13 is connected to the positive electrode 10, and a negative electrode lead 23 is connected to the negative electrode 20.

One end portion in the length direction of the positive electrode lead 13 is connected to the positive electrode 10, and the other end thereof is connected to a sealing plate 90. The sealing plate 90 includes a positive electrode terminal 15. One end of the negative electrode lead 23 is connected to the negative electrode 20 and the other end thereof is connected to the bottom of a battery case 70 serving as the negative electrode terminal. The battery case 70 is a bottomed cylindrical battery can: one end in the longitudinal direction is opened, and the bottom of the other end serves as the negative electrode terminal. The battery case (battery can) 70 is made of metal, for example, formed of iron. To the inner surface of the iron battery case 70, usually nickel plating is applied. To the top and bottom of the wound-type electrode group 40, a resin upper insulating ring 80 and a lower insulating ring 60 are disposed.

In the illustrated example, a cylindrical lithium secondary battery including a wound-type electrode group has been described, but the present embodiment is not limited to this case and can be applied to other cases. The shape of the lithium secondary battery can be appropriately selected from various shapes depending on the application, and can be, in addition to the cylindrical shape, a coin-shaped, prism-shaped, sheet-type, and flat-type. The form of the electrode group is not particularly limited, and may be a stacked type. In addition, other than the negative electrode structures of the lithium secondary battery, a known structure can be used without any particular limitation.

The present invention will be described in detail below with reference to Examples and Comparative Examples. The present invention, however, is not limited to the following Examples.

EXAMPLE 1

(1) Preparation of Positive Electrode

A lithium-containing composite oxide ($LiNi_{0.9}Co_{0.05}Al_{0.05}O_2$) as a positive electrode active material, acetylene black, polyvinylidene fluoride, and N-methyl-2-pyrrolidone (NMP) were mixed at a predetermined mass ratio to prepare a positive electrode slurry. Next, the positive electrode slurry was applied to the surface of an aluminum foil as a positive electrode current collector, and the coating film was dried, and then rolled to form a positive electrode mixture layer on both surfaces of the aluminum foil.

(2) Preparation of Negative Electrode

Electrolytic copper foil having a thickness of 10 μm was cut into a predetermined electrode size to obtain a negative electrode current collector.

(3) Preparation of Electrolyte

In a mixed solvent containing fluoroethylene carbonate (FEC), ethyl methyl carbonate (EMC), and dimethyl ether (DME) in a volume ratio of 4:1:15, $LiPF_6$ as a lithium salt and cesium difluorooxalate borate ($CsBF_2(C_2O_4)$) as a salt of the cation X and the oxalate complex anion Y (in Table 1, shown as CsFOB) were added to prepare an electrolyte. The concentration of $LiPF_6$ in the electrolyte was set to 1.0 mol/liter. The concentration of $CsBF_2(C_2O_4)$ in the electrolyte was set to 0.1 mol/liter.

(4) Fabrication of Batteries

A lead tab was attached to each electrode, and an electrode group was produced by winding the positive electrode and the negative electrode in a spiral shape with a separator interposed so that the leads were positioned at the outermost peripheral portion. The electrode group was inserted into a housing made of a laminated film having aluminum foil as a barrier layer, and after vacuum diving at 105° C. for 2 hours, an electrolyte was injected, and the opening of the housing was sealed, thereby obtaining Battery A1.

EXAMPLE 2

In the preparation of the electrolyte, magnesium difluorooxalate borate ($Mg(BF_2(C_2O_4))_2$) was used instead of $CsBF_2(C_2O_4)$ (In Table 1, shown as $MgFOB_2$). The concentration of $Mg(BF_2(C_2O_4))_2$ in the electrolyte was set to 0.1 mol/liter. Except for this, Battery A2 was obtained in the same manner as in Example 1.

Comparative Example 1

In the preparation of the electrolyte, $CsPF_6$ was used instead of $CsBF_2(C_2O_4)$. The concentration of $CsPF_6$ in the electrolyte was set to 0.1 mol/liter. Except for this, Battery B1 was obtained in the same manner as in Example 1.

Comparative Example 2

In the preparation of the electrolyte, $Mg(N(SO_2CF_3)_2)_2$ (in Table 1, shown as $MgTFSI_2$) was used instead of $CsBF_2(C_2O_4)$. The concentration of $(N(SO_2CF_3)_2)_2$ in the electrolyte was set to 0.1 mol/liter. Except for this, Battery B2 was obtained in the same manner as in Example 1.

Comparative Example 3

$CsBF_2(C_2O_4)$ was not used in the preparation of the electrolyte. Except for this, Battery B3 was obtained in the same manner as in Example 1.

[Evaluation 1]

The Batteries A1, A2, and B1 to B3 thus obtained were subjected to a charge and discharge test.

In the charge and discharge test, the battery was charged under the following conditions in a constant temperature bath at 25° C., then rested for 20 minutes, and discharged under the following conditions. This set of charging and discharging is regarded as 1 cycle, and the batteries were subjected to the charge and discharge test of 50 cycles: a value obtained by dividing the discharge capacity of the 50th cycle by the discharge capacity of the first cycle was regarded as a capacity retention rate (%). The evaluation results are shown in Table 1.

(Charge)

Constant current charging was performed at a current of 0.31 It until the battery voltage reached 4.1V, then, and constant voltage charging was performed at the voltage of 4.1V until the current value reached 0.02 It.
(Discharge)

Constant current discharge was performed at a current of 0.31 It until the battery voltage reached 2.85V.

TABLE 1

| Battery | Cation X salt | | Lithium salt | | Capacity retention rate (%) |
|---|---|---|---|---|---|
| | Type | Concentration (mol/L) | Type | Concentration (mol/L) | |
| A1 | CsFOB | 0.1 | LiPF$_6$ | 1.0 | 63.6 |
| A2 | MgFOB$_2$ | 0.1 | LiPF$_6$ | 1.0 | 62.2 |
| B1 | CsPF$_6$ | 0.1 | LiPF$_6$ | 1.0 | 48.5 |
| B2 | MgTFSI$_2$ | 0.1 | LiPF$_6$ | 1.0 | 37.3 |
| B3 | None | — | LiPF$_6$ | 1.0 | 53.1 |

In Table 1, it can be understood that when the electrolyte contains both of the cation X and the oxalate complex anion Y, the capacity retention rate is remarkably improved. On the other hand, in the Batteries B1 and B2 in which only the cation X is included in the electrolyte, the capacity retention rate is lower than that of the Battery B3 in which the cation X is not included.

Reference Example 1

Graphite as a negative electrode active material, sodium carboxy methylcellulose (CMC-Na), styrene-butadiene rubber (SBR), and water were mixed at a predetermined mass ratio to prepare a negative electrode slurry. Next, the negative electrode slurry was applied to the surface of a copper foil as the negative electrode current collector, and the coating film was dried and then rolled to form negative electrode mixture layers on both surfaces of the copper foil.

Battery R1 was obtained in the same manner as in Example 1, except that the above negative electrode was used.

Reference Example 2

Battery R2 was obtained in the same manner as in Comparative Example 3, except that the negative electrode of Reference Example 1 was used, in which neither the cation X nor the oxalate complex anion Y was contained in the electrolyte.

[Evaluation 2]

Batteries R1 and R2 thus obtained were subjected to the charge and discharge test in the same manner as in Evaluation 1. The evaluation results are shown in Table 2.

TABLE 21

| Battery | Cation X salt | | Lithium salt | | Capacity retention rate (%) |
|---|---|---|---|---|---|
| | Type | Concentration (mol/L) | Type | Concentration (mol/L) | |
| R1 | CsFOB | 0.1 | LiPF$_6$ | 1.0 | 96.5 |
| R2 | None | — | LiPF$_6$ | 1.0 | 95.2 |

In Table 2, there was no clear difference in the capacity retention rate between Batteries R1 and R2. From this, it can be understood that the synergistic effect due to the electrolyte containing both the cation X and the oxalate complex anion Y is an effect unique to a lithium secondary battery in which a lithium metal deposits at the time of charging on a negative electrode and a lithium metal is dissolved in an electrolyte during discharge.

INDUSTRIAL APPLICABILITY

Since the lithium secondary battery according to the present invention has excellent cycle characteristics, it can be Used in electronic devices such as mobile phones, smartphones tablet terminals, electric vehicles including hybrid and plug-in hybrid electric vehicles, and household storage batteries in combination with solar cells.

LIST OF REFERENCE NUMERALS

10 Positive electrode
13 Positive electrode lead
15 Positive electrode terminal
20 Negative electrode
23 Negative electrode lead
30 Separator
40 Wound electrode group
60 Lower insulation ring
70 Battery case
80 Upper insulating ring
90 Sealing plate
100 Lithium secondary battery

The invention claimed is:

1. A lithium secondary battery comprising a positive electrode, a negative electrode, a lithium ion conductive nonaqueous electrolyte, and a separator disposed between the positive electrode and the negative electrode, wherein
on the negative electrode, a lithium metal deposits at the time of charging, and the lithium metal is dissolved in the nonaqueous electrolyte at the time of discharging,
the nonaqueous electrolyte contains a cation and an anion,
the cation comprises a lithium ion and at least one cation X selected from the group consisting of Na, K, Rb, Cs, Fr, Mg, Ca, Sr, Ba, and Al,
the anion comprises an oxalate borate complex anion Y, the oxalate borate complex anion Y containing fluorine, and
a concentration of the oxalate borate complex anion Y in the nonaqueous electrolyte is 0.5 mol/liter or less.

2. The lithium secondary battery according to claim 1, wherein the oxalate borate complex anion Y is BF$_2$(C$_2$O$_4$)—.

3. The lithium secondary battery according to claim 1, wherein the concentration of the oxalate borate complex anion Y in the nonaqueous electrolyte is 0.01 mol/liter or more and 0.5 mol/liter or less.

4. The lithium secondary battery according to claim 1, wherein a concentration of the cation X in the nonaqueous electrolyte is 0.01 mol/liter or more and 0.5 mol/liter or less.

5. The lithium secondary battery according to claim 1, wherein a concentration of the lithium ion in the nonaqueous electrolyte is 0.5 mol/liter or more and 3.5 mol/liter or less.

6. The lithium secondary battery according to claim 1, wherein the positive electrode includes a positive electrode mixture layer containing a positive electrode active material and a positive electrode current collector,
the positive electrode active material comprises a composite oxide comprising lithium and a transition metal, and
a molar ratio: $M_{Li}/M_{TM}$ of an amount of the sum of lithium included in the positive electrode and the negative electrode $M_{Li}$ to an amount of the transition metal included in the positive electrode $M_{TM}$ is 1.1 or less.

7. The lithium secondary battery according to claim 1, wherein the anion further comprises $PF_6^-$ ion, and a molar basis ratio of a content of the oxalate borate complex anion Y to a content of the $PF_6^-$ ion in the electrolyte is 0.1 or more and 0.5 or less.

* * * * *